US012335636B2

(12) United States Patent
Shoda et al.

(10) Patent No.: US 12,335,636 B2
(45) Date of Patent: Jun. 17, 2025

(54) IMAGING APPARATUS, IMAGING METHOD, AND STORAGE MEDIUM

(71) Applicant: CANON KABUSHIKI KAISHA, Tokyo (JP)

(72) Inventors: Satoshi Shoda, Tochigi (JP); Yasushi Ohwa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 18/345,000

(22) Filed: Jun. 30, 2023

(65) Prior Publication Data

US 2024/0015411 A1    Jan. 11, 2024

(30) Foreign Application Priority Data

Jul. 6, 2022   (JP) ................................. 2022-109350

(51) Int. Cl.
*H04N 23/90* (2023.01)
*G06T 7/00* (2017.01)
(Continued)

(52) U.S. Cl.
CPC ............. *H04N 23/90* (2023.01); *G06T 7/97* (2017.01); *H04N 23/13* (2023.01); *H04N 23/84* (2023.01); *G06T 2207/20212* (2013.01)

(58) Field of Classification Search
CPC ........ H04N 23/90; H04N 23/13; H04N 23/84; H04N 23/11; H04N 23/71; H04N 23/73;
(Continued)

(56) References Cited

U.S. PATENT DOCUMENTS 6,654,062 B1 * 11/2003 Numata ................. H04N 23/74
348/E5.04
7,961,229 B2    6/2011 Soga
(Continued)

FOREIGN PATENT DOCUMENTS

JP       2008-252639 A     10/2008

*Primary Examiner* — Chiawei Chen
(74) *Attorney, Agent, or Firm* — Cowan, Liebowitz & Latman, P.C.

(57) ABSTRACT

An imaging apparatus comprising: an imaging device having a first imaging unit configured to generate an image having a first spectral characteristic and a second imaging unit configured to generate an image having a second spectral characteristic, a calculation unit configured to calculate a first exposure time appropriate for an image having the first spectral characteristic and a second exposure time appropriate for an image having the second spectral characteristic, a control unit configured to, in a case where the first exposure time is longer than the second exposure time, perform first image capture with the second exposure time to generate a first image having the first spectral characteristic and a second image having the second spectral characteristic, and perform second imaging with an exposure time corresponding to a difference between the first exposure time and the second exposure time to generate a third image having the first spectral characteristic, and a combining unit configured to combine the first image and the third image to generate a combined image.

9 Claims, 7 Drawing Sheets

(51) Int. Cl.
*H04N 23/13* (2023.01)
*H04N 23/84* (2023.01)

(58) Field of Classification Search
CPC .............. H04N 23/951; G06T 7/97; G06T 2207/20212
See application file for complete search history.

(56) References Cited

U.S. PATENT DOCUMENTS

| | | | |
|---|---|---|---|
| 10,847,556 B2* | 11/2020 | Ikuma | H04N 17/002 |
| 11,330,204 B1* | 5/2022 | Soundrapandian | H04N 23/45 |
| 2009/0059046 A1* | 3/2009 | Hasegawa | H04N 23/74 |
| | | | 348/E5.091 |
| 2012/0154596 A1* | 6/2012 | Wajs | H04N 23/11 |
| | | | 348/E5.09 |
| 2013/0021507 A1* | 1/2013 | Wang | H04N 23/741 |
| | | | 348/E9.002 |
| 2016/0006962 A1* | 1/2016 | Kimura | H04N 25/701 |
| | | | 348/307 |
| 2017/0187949 A1* | 6/2017 | Kim | H04N 25/589 |
| 2020/0077033 A1* | 3/2020 | Chan | H04N 23/951 |

* cited by examiner

IMAGING APPARATUS, IMAGING METHOD, AND STORAGE MEDIUM

BACKGROUND OF THE INVENTION

Field of the Invention

The present invention relates to an imaging apparatus, an imaging method, a storage medium, and the like.

Description of the Related Art

In recent years, an imaging apparatus having a function of simultaneously capturing a wavelength band of visible light and a wavelength band of invisible light has been developed. According to Japanese Patent Application Laid-Open No. 2008-252639, an imaging apparatus is proposed in which light incident on a single imaging optical system is separated for each wavelength of light by a light separation unit to enable simultaneous acquisition of images captured by each of visible light and infrared light.

In image capture in a wavelength band of visible light and a wavelength band of invisible light, there is a case in which only one of the wavelength bands is strongly reflected (transmitted) depending on spectral characteristics of an object and a light source in an image capturing scene, and there is a drawback that exposure conditions appropriate for each wavelength are different.

In contrast, according to the technology in Japanese Patent Application Laid-Open No. 2008-252639, imaging units that are different for each wavelength after the light that has passed through a single optical system is separated are configured, and thereby, mechanical shutters are individually controlled for each wavelength to acquire a signal with a suitable exposure level. However, there is a drawback that the cost of the imaging apparatus is higher than that of conventional imaging apparatus because different imaging units are used for each wavelength.

Thus, one of the purposes of the present invention is providing an imaging apparatus capable of capturing a plurality of image signals having different spectral characteristics and acquiring image data suitable for each of the spectral characteristics.

SUMMARY OF THE INVENTION

An imaging apparatus comprising: an imaging device having a first imaging unit configured to generate an image having a first spectral characteristic and a second imaging unit configured to generate an image having a second spectral characteristic; at least one processor or circuit configured to function as: a calculation unit configured to calculate a first exposure time appropriate for an image having the first spectral characteristic and a second exposure time appropriate for an image having the second spectral characteristic; a control unit configured to, in a case where the first exposure time is longer than the second exposure time, perform first image capture with the second exposure time to generate a first image having the first spectral characteristic and a second image having the second spectral characteristic, and perform second imaging with an exposure time corresponding to a difference between the first exposure time and the second exposure time to generate acquire a third image having the first spectral characteristic; and a combining unit configured to combine the first image and the third image to generate a combined image.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate descriptions will be omitted or simplified.

Note that, in the embodiment, an example of application to a network camera and the like serving as an imaging apparatus will be explained. However, the imaging apparatus includes electronic devices having an imaging function, such as a digital still camera, a digital movie camera, a smartphone with a camera, a tablet computer with a camera, an in-vehicle camera, a drone camera, and a camera mounted on a robot.

First Embodiment

Figure 1:
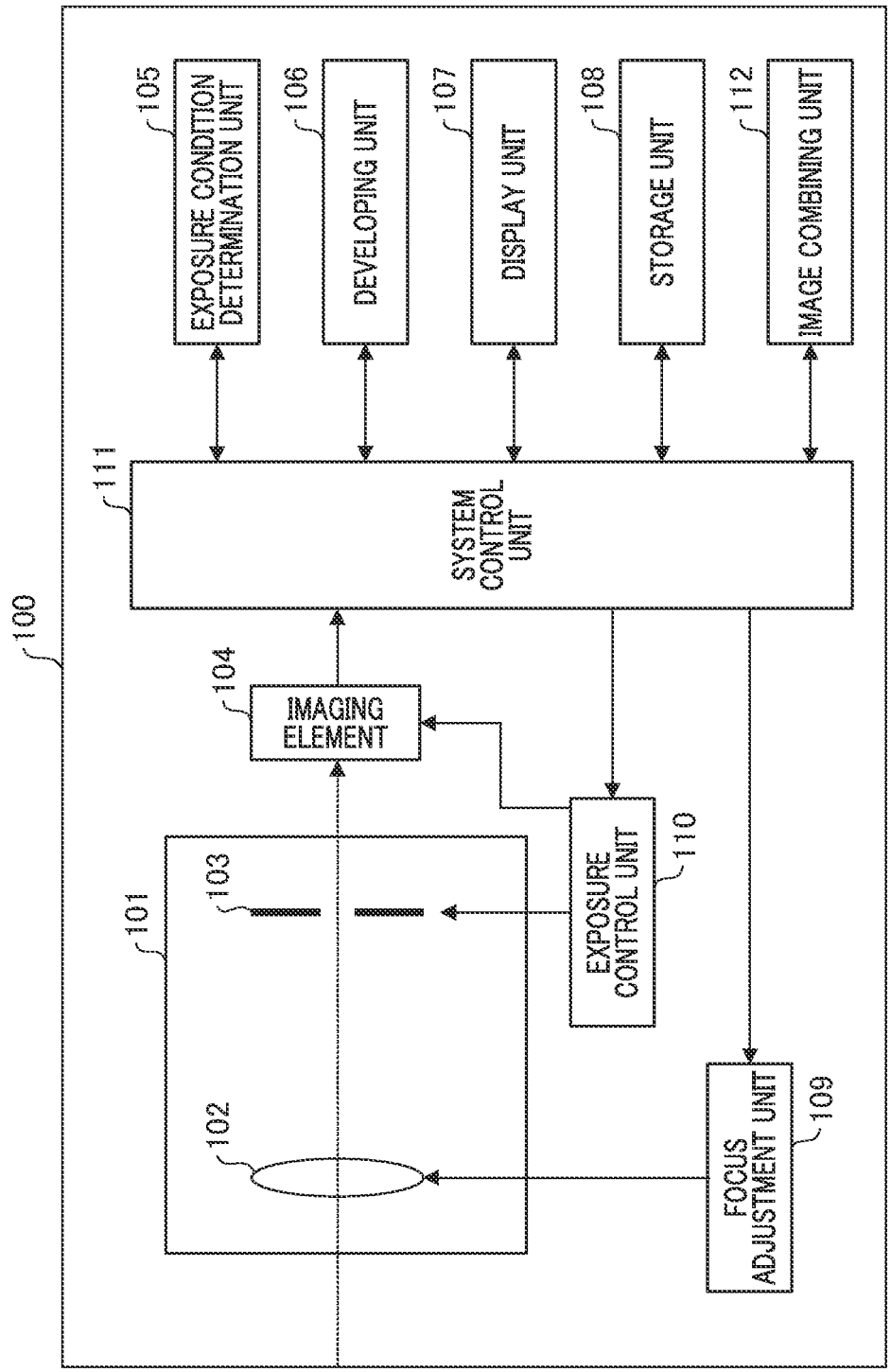
FIG. 1 is a functional block diagram of an imaging apparatus according to the first embodiment.

Hereinafter, the first embodiment of the present invention will be explained with reference to the drawings. FIG. 1 shows the functional block diagram of the imaging apparatus according to the first embodiment. Note that some of the functional blocks shown in FIG. 1 are achieved by causing a CPU serving as a computer (not illustrated) included in the imaging apparatus to execute a computer program stored in a memory serving as a storage medium (not illustrated).

However, some or all of them may be realized by hardware. As the hardware, a dedicated circuit (ASIC), a processor (reconfigurable processor, DSP), and the like can be used.

Additionally, each of the functional blocks shown in FIG. 1 may not necessarily be incorporated in the same housing, and may be configured by separate devices connected to each other via a signal path. Note that the above explanation related to FIG. 1 similarly applies to the functional block diagram in FIG. 6.

Reference numeral 101 denotes an optical system configured by a lens group 102 including a focus lens, a diaphragm 103, and the like, and forms an object image by condensing a light flux from an object using a lens. Reference numeral 104 denotes an imaging element that converts an object image into an electric signal by photoelectric conversion, performs AD conversion, and outputs the electric signal as an image signal.

The imaging element 104 includes a plurality of photoelectric conversion elements for each pixel, and each photoelectric conversion element in the pixel is configured to capture and receive light fluxes having different incident directions. The imaging element 104 can separate and output parallax images formed by each of the photoelectric conversion elements for each light flux having different incident directions, and can also add photoelectric conversion signals of the plurality of photoelectric conversion elements for each pixel and output the result as an image signal in units of pixels.

Reference numeral 111 denotes a system control unit. A CPU serving as a computer is built in the system control unit 111, and the system control unit 111 controls the operation of each unit of the entire apparatus based on a computer program stored in a memory serving as a storage medium.

An exposure condition determination unit 105 calculates an exposure parameter such that a proper exposure image can be obtained for each of visible light and invisible light based on the image signal obtained from the imaging element, and determines an image capture parameter to be used for image capture based on the exposure parameter. The image capture parameters are sent to an exposure control unit 110 via the system control unit 111 during image capture. Note that, in the present embodiment, exposure and exposed to light are used with the same meaning.

Reference numeral 106 denotes a developing unit that includes an image processing circuit, receives image signals obtained from the imaging element 104, performs various image processing such as white balance correction and noise reduction (not illustrated), and generates image signals used for display and recording.

Reference numeral 107 denotes a display unit that displays a display image signal output from the developing unit 106 to a user, and includes, for example, a liquid crystal display. Reference numeral 108 denotes a storage unit that can store temporary data and recording image data output from each functional block, and a computer program to be executed by the CPU in the system control unit 111. In the storage unit 108, various data are written via the system control unit 111, and readout control of various data are performed.

The exposure control unit 110 receives the image capture parameters determined by the exposure condition determination unit 105 via the system control unit 111, and performs adjustments of the aperture diameter of the diaphragm 103, exposure time control in the imaging element 104, and the like. An image combining unit 112 that combines a plurality of image signals and generates a combined image.

Figure 2:
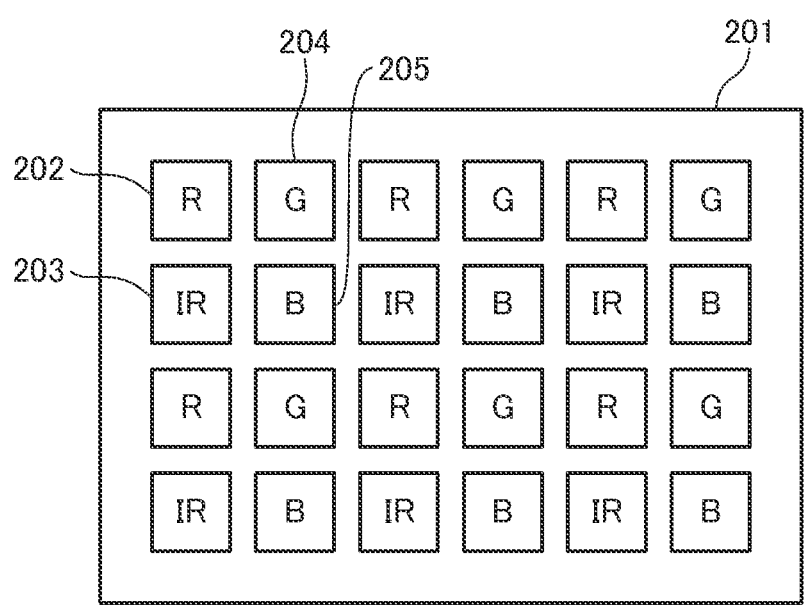
FIG. 2 is a schematic diagram showing an example of arrangement of color filters of an imaging element according to the first embodiment.

Next, the configuration of the imaging element 104 in the first embodiment will be explained in detail with reference to FIG. 2 and FIG. 3. FIG. 2 is a schematic diagram showing an example of the arrangement of color filters in the imaging element according to the first embodiment.

In a light receiving unit 201, pixels including photoelectric conversion elements such as a photodiode, are two dimensionally arranged, and a color filter is arranged on each pixel so that a specific wavelength band of the light flux from the object is transmitted.

Reference numeral 202 denotes an R filter that transmits red light, reference numeral 203 denotes an IR filter that transmits infrared light, reference numeral 204 denotes a G filter that transmits green light, and reference numeral 205 denotes a B filter that transmits blue light, and a combination of these four color filters of 2×2 is repeatedly and regularly arranged. The light flux that has been transmitted through these color filters is photoelectrically converted by the photoelectric conversion elements in the pixels arranged directly below each of the color filters, and is output from the imaging element 104 as electric signals.

Note that the pixels that receive light through the R filter 202, the G filter 204, and the B filter 205 configure the first imaging unit, and a visible light image (an image having the first spectral characteristic) is generated by the first imaging unit. Additionally, the IR filter 203 configures a second imaging unit, and an invisible light image (an image having the second spectral characteristic) is generated by the second imaging unit.

As described above, in the first embodiment, the imaging elements of the first imaging unit that generates an image having the first spectral characteristic and the second imaging unit that generates an image having the second spectral characteristic are arranged in the same imaging element. Then, an imaging step of simultaneously generating images by the first imaging unit and the second imaging unit is executed.

Note that, although, in the first embodiment, one of the first spectral characteristic and the second spectral characteristic is visible light, the other is invisible light, and the invisible light is infrared light, the present invention is not limited thereto.

Figure 3:
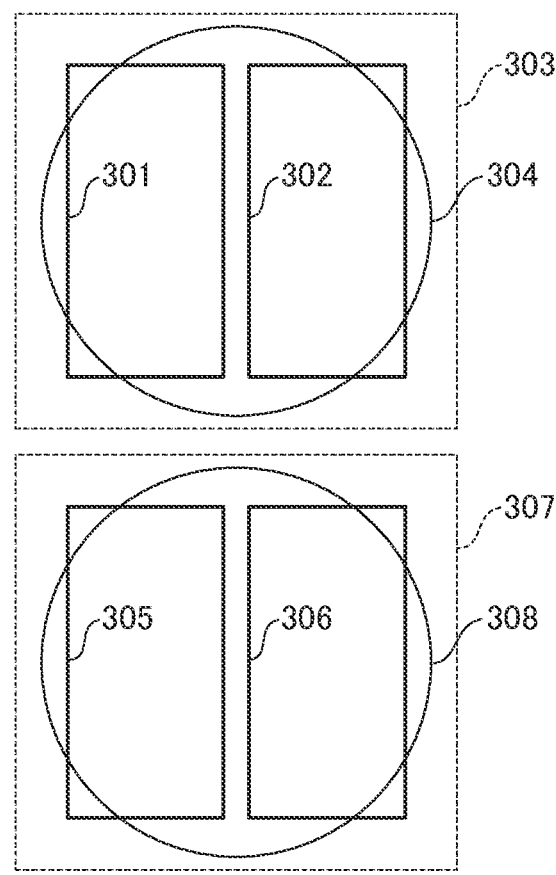
FIG. 3 is a schematic diagram showing the pixel structure of the imaging element according to the first embodiment.

FIG. 3 is a schematic diagram showing the structure of a pixel of the imaging element according to the first embodiment, and shows an example of arrangement of photoelectric conversion elements in each pixel configuring the imaging element 104 as viewed from the object side. In FIG. 3, reference numerals 303 and 307 denote pixels adjacent to each other in the vertical direction (vertical scanning line direction) in the drawing.

In the pixel 303, two photoelectric conversion elements 301 and 302 are arranged side by side in the horizontal scanning line direction. Similarly, two photoelectric conversion elements 305 and 306 are arranged side by side in the horizontal scan line direction in the pixel 307.

Additionally, micro lenses 304 and 308 are disposed on the pixels 303 and 307, and color filters (not illustrated) are disposed on the pixels 303 and 307. Additionally, the right and left photoelectric conversion elements 301 and 302 in the drawing respectively receive light from the right and left exit pupils when viewed from the object side of the optical system via the micro lens 304, and the photoelectric conversion elements 305 and 306 also respectively receive light from the right and left exit pupils when viewed from the object side via the micro lens 308.

Note that the other pixels that are present on the imaging element 104 have the similar configuration as those shown in FIG. 3, and are repeatedly arranged two dimensionally in the horizontal direction and the vertical direction on the imaging element 104. Therefore, a set of outputs from the photoelectric conversion elements on the left side of each pixel in the drawing forms a first image signal obtained when the object is viewed from the right pupil of the optical system.

In contrast, a set of outputs from the photoelectric conversion elements on the right side of each pixel in the drawing forms a second image signal when the object is viewed from the left pupil of the optical system. Note that the first image signal and the second image signal are image signals having a parallax corresponding to the distance between the right and left pupils. Additionally, a normal image signal can be obtained by adding and reading out the output of the two photoelectric conversion elements of each pixel.

By using this configuration, the visible light image corresponding to a pixel having the color filters that transmit visible light, such as the R filter 202, the G filter 204, and the B filter 205, can be output as the first image.

Additionally, the infrared light image corresponding to a pixel having the color filter, which transmits infrared light, such as the IR filter 203, can be output as a second image. That is, the first image, which is a visible light image, and the second image, which is an infrared light image, can be simultaneously acquired from the imaging element 104.

Figure 4:
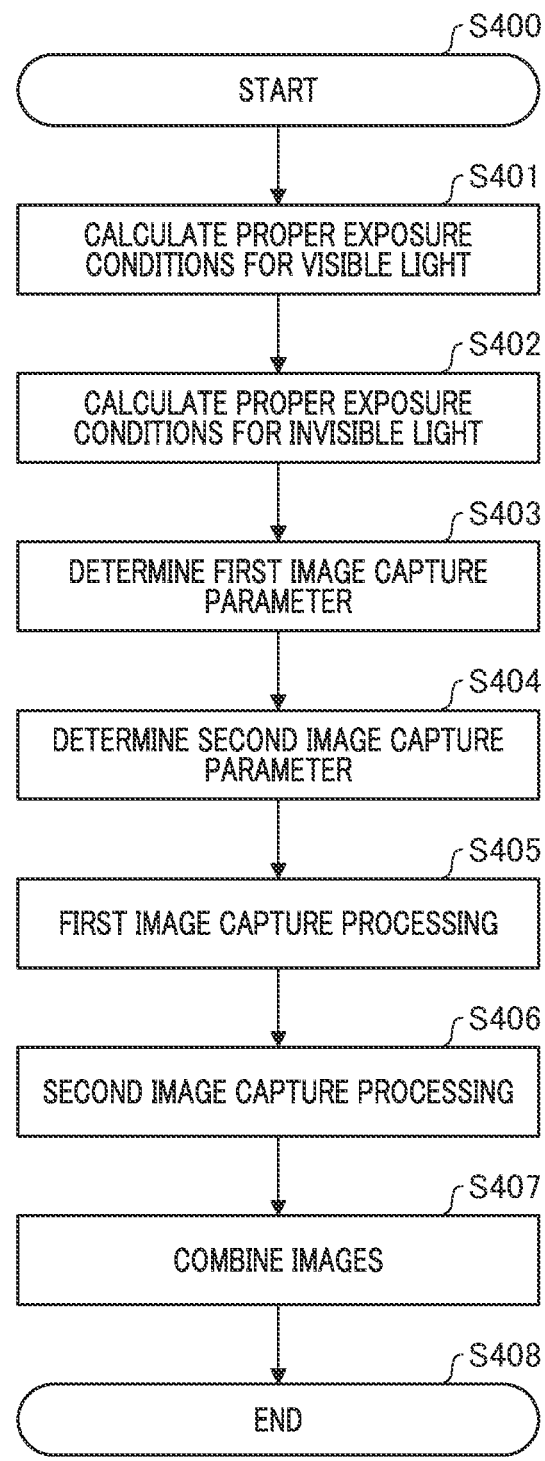
FIG. 4 is a flowchart showing the imaging processing flow according to the first embodiment.

Next, the image capture processing flow in the first embodiment will be explained with reference to FIG. 4. FIG. 4 is a flowchart showing the image capture processing flow according to the first embodiment. Note that the CPU serving as a computer in the system control unit 111 executes a computer program stored in the memory to perform the operation of each step in the flowchart in FIG. 4.

In step S400, the CPU starts the image capture processing flow as shown in FIG. 4 by, for example, turning on the power of the imaging apparatus. In step S401, the CPU calculates an exposure parameter (first exposure parameter) such that a proper exposure image corresponding to visible light is obtained by the exposure condition determination unit 105 serving as a calculation unit.

Note that, as a calculation method, for example, the signals from pixels for visible light may be averaged temporally and spatially, and the exposure parameters may be calculated such that the average level becomes a predetermined appropriate value.

Note that in this context, exposure parameters include at least exposure time, aperture value, and ISO sensitivity. Note that the exposure time is the exposure time control of the imaging element, and the ISO sensitivity is the output gain of the imaging element. Note that, in the first embodiment, it is assumed that the first exposure time appropriate for the image having the first spectral characteristic is calculated in step S401 based on, for example, the average level of luminance of the image having the first spectral characteristic (visible light).

In step S402, the CPU calculates the exposure parameter (second exposure parameter) such that a proper exposure image corresponding to invisible light (infrared light) is obtained by the exposure condition determination unit 105. In the second exposure parameter, the aperture value and ISO sensitivity are set to the same values as those in the first exposure parameter.

Note that, also in step S402, for example, the luminance signals from pixels for infrared light are averaged temporally and spatially, and the second exposure time such that the average level becomes a predetermined appropriate value is calculated.

Thus, steps S401 and S402 function as calculation steps in which the first exposure time appropriate for the image having the first spectral characteristic and the second exposure time appropriate for the image having the second spectral characteristic are calculated. Additionally, in the first embodiment, the first exposure time is calculated based on the average level of luminance of an image having the first spectral characteristic, and the second exposure time is calculated based on the average level of luminance of an image having the second spectral characteristic.

In step S403, the CPU causes the exposure condition determination unit 105 to compare the exposure time in the first exposure parameter and the exposure time in the second exposure parameter, and determine the exposure parameter having the shorter exposure time as a result of the comparison as the first image capture parameter.

In step S404, the CPU causes the exposure condition determination unit 105 to compare the exposure time in the first exposure parameter and the exposure time in the second exposure parameter. Subsequently, the difference obtained by subtracting the shorter exposure time as a result of the comparison, from the longer exposure time as a result of the comparison is determined to be the exposure time of the second image capture parameter. Note that the aperture value and ISO sensitivity of the second image capture parameter at this time are set to the same setting values as those of the first image capture parameter.

In step S405, the CPU performs the first image capture processing based on the first image capture parameter by the system control unit 111. That is, in step S405, for example, when the first exposure time is longer than the second exposure time, the first image capture is performed with the second exposure time to acquire the first image having the first spectral characteristic and the second image having the second spectral characteristic.

The first image (visible light image) and the second image (infrared light image) captured based on the first image capture parameter are output to and stored in the storage unit 108. Additionally, upon completion of the exposure performed by the first image capture processing, the process proceeds to step S406 and the processing shifts to the second image capture processing.

In step S406, the CPU performs the second image capture processing based on the second image capture parameter by the system control unit 111. In the first embodiment, the visible light image or infrared light image obtained from a group of pixels having a wavelength corresponding to the exposure parameter in which the exposure time is longer, from among the first exposure parameter for visible light and the second exposure parameter for infrared light, is output as the third image and stored in the storage unit 108.

Additionally, in step S406, a second image capture is performed with an exposure time corresponding to the difference between the first exposure time and the second exposure time, and if the first exposure time is longer than the second exposure time, a third image having at least the first spectral characteristic is acquired. Note that in this context, step S405 and step S406 function as control steps for performing the operations as described above.

In step S407 (combining step), the CPU generates a combined image by combining either the first image or the second image obtained in the first image capture processing, and the third image obtained in the second image capture processing, by the image combining unit 112. The decision to use either the first image or the second image is performed by comparing the exposure times of the first exposure parameter and second exposure parameter.

That is, if the exposure time of the first exposure parameter for visible light is shorter than the exposure time of the second exposure parameter for infrared light, the second image (infrared light image) and the third image (infrared light image) are combined to generate a proper exposure image in invisible light.

In contrast, if the exposure time of the first exposure parameter is longer than the exposure time of the second exposure parameter, the first image (visible light image) and the third image (visible light image) are combined to generate a proper exposure image in visible light. That is, in step S407, for example, if the first exposure time is longer than the second exposure time as described above, the first image and the third image are combined to generate a combined image.

The generated combined image is output to and stored in the storage unit 108. Subsequently, in step S408, the CPU ends the image capture processing flow. The proper exposure images at each wavelength stored in this way are converted to final recording and display data via the developing unit 106 and the display unit 107, and used.

Figure 5:
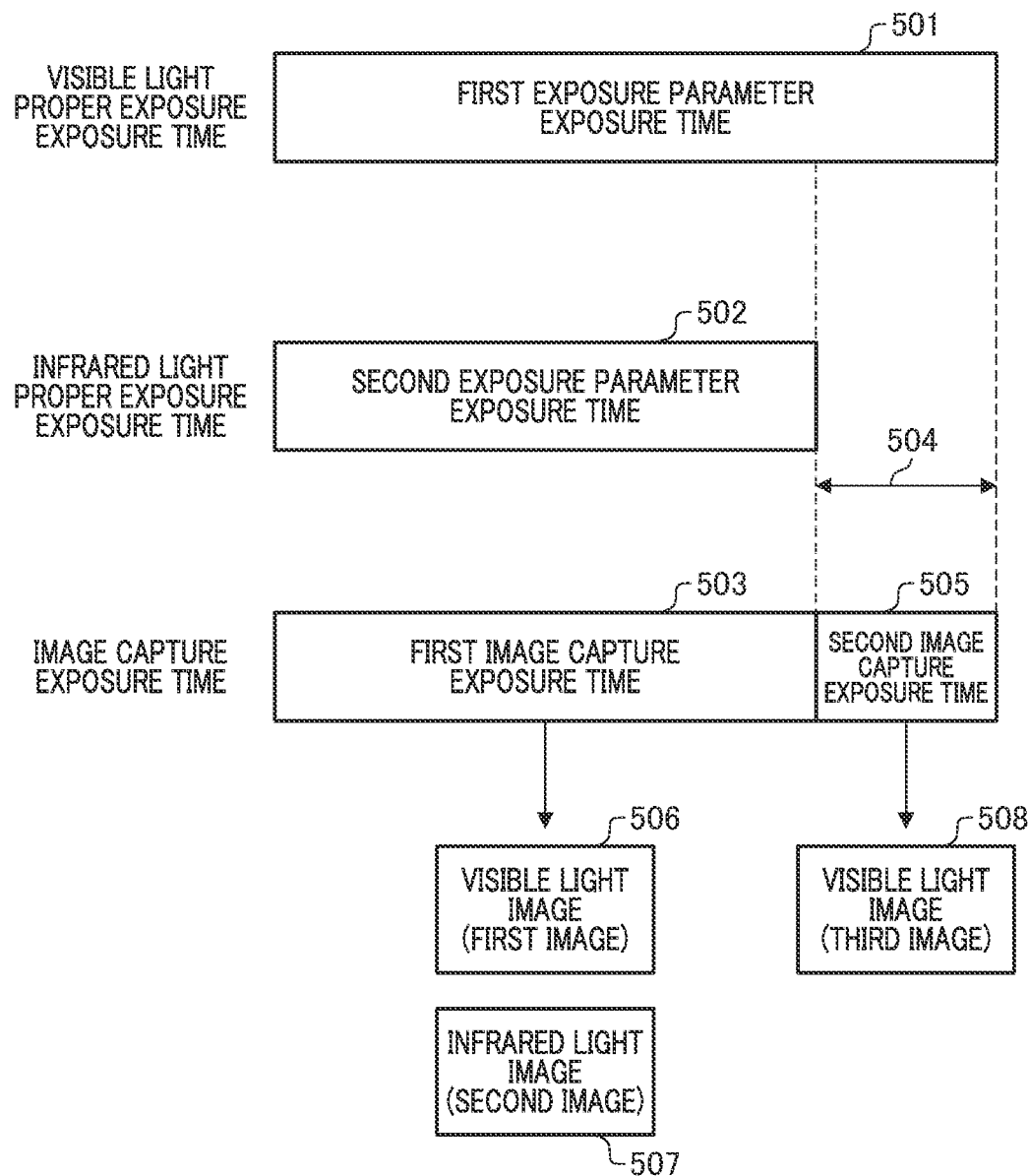
FIG. 5 is a drawing showing the relation between the exposure time for each wavelength and the exposure time of the image capture processing in the first embodiment.

FIG. 5 is a drawing showing the relation between the exposure time for each wavelength and the exposure time in the image capture processing in the first embodiment, and shows the relation between the exposure parameter for obtaining the proper exposure for each wavelength and the exposure time in the image capture processing. In FIG. 5, an example in which the exposure time for obtaining a proper exposure in visible light is longer than the exposure time for obtaining a proper exposure in infrared light is shown.

In FIG. 5, the horizontal axis shows the exposure time, reference numeral 501 denotes the exposure time for obtaining a proper exposure image in visible light, and reference numeral 502 denotes the exposure time for obtaining a proper exposure image in infrared light. In such a case, in the first image capture parameter determination processing in step S403, 501 and 502 are compared, and the exposure time of 502, which has a shorter exposure time, is adopted as an exposure time 503 of the first image capture parameter.

Additionally, in the second image capture parameter determination processing in step S404, a difference time 504 between 501 and 502 is adopted as an exposure time 505 of the second image capture parameter.

In the first image capture processing in step S405, exposure processing is performed based on the exposure time 503 of the first image capture parameter, and a visible light image (first image) 506 and an infrared light image (second image) 507 can be obtained.

In the second image capture processing in step S406, exposure processing is performed based on the exposure time 505 of the second image capture parameter. In this case, since, among the first exposure parameter for visible light and the second exposure parameter for infrared light, the wavelength corresponding to the exposure parameter in which the exposure time is longer is visible light, it is assumed that a visible light image is a third image 508.

In the combining processing in step S407, the image signal corresponding to the exposure time 501 for obtaining a proper exposure image in visible light is generated by combining the visible light image (first image) 506 and the visible light image (third image) 508.

As explained above, in an imaging apparatus 100 in the first embodiment, imaging processing is executed two times consecutively based on the image capture parameters calculated for each of visible light and infrared light. Furthermore, it is possible to obtain a proper exposure image corresponding to any wavelength by combining the image signal obtained by the image capture at the second time and the image signal obtained by the first image capture at a wavelength corresponding to the longer exposure time.

Additionally, although, here, the exposure condition determination unit 105 determines the parameter such that the proper exposure is obtained in the camera, the present embodiment is not limited thereto, and the user may decide the exposure time for each wavelength.

Additionally, although, in the present embodiment, the example in which the image signal to be displayed or recorded in the image processing apparatus or the imaging apparatus is acquired by adding and reading the signals from a pair of photoelectric conversion elements configuring each pixel has been described, the readout unit from the imaging element is not limited thereto.

If the first image signal and the second image signal having parallax are acquired from each of the photoelectric conversion elements in a pair as described above to acquire a parallax image at each wavelength, focus detection can also be performed by correlation calculation based on parallax. Note that each of the first image signal and the second image signal may be read out without being added and then added by the developing unit 106, and subsequently, combining processing that is similar to that described in the embodiment may be performed.

Further, after the first image signal and the second image signal are respectively read out without being added, the combining processing that is similar to the above-described embodiment may be performed on the first and second image signals corresponding to visible light and the first and second image signals corresponding to infrared light. Accordingly, the levels of each of the first and second image signals corresponding to visible light and the first and second image signals corresponding to infrared light can be adjusted, and the focus position for visible light and the focus position for infrared light can separately be detected at appropriate exposure levels.

Furthermore, if the position of the focus lens is adjusted based on the focus position for the visible light and the focus position for infrared light, for example, so that the focus position results from the weighted addition of both, it is possible to acquire an image in focus in both the visible light and the infrared light.

Note that, in the weight in that case, for example, the color temperature of the object may be calculated based on the ratio of RGB, and the weight may be changed according to the color temperature. For example, if the color temperature is low, the weight for the focus position for infrared light may be set to be higher than the weight for the focus position for visible light, and conversely, if the color temperature of the object is high, the weight for the focus position for visible light may be set to be higher than the focus position for infrared light.

Additionally, in the present embodiment, the exposure condition determination unit 105 calculates an exposure time such that proper exposure is obtained based on the average value of a plurality of pixel outputs corresponding to each wavelength in order to obtain an image with proper exposure. An example in which the exposure time during image capture is determined thereby is shown. That is, an example has been shown in which the first exposure time is calculated based on the average level of luminance of an image having the first spectral characteristic, and the second exposure time is calculated based on the average level of luminance of an image having the second spectral characteristic.

However, for example, the output of a plurality of pixels corresponding to each of wavelengths imaged may be compared to a predetermined threshold, and an appropriate exposure parameter corresponding to the wavelength (for example, exposure time) may be calculated based on the number of saturated pixels. That is, the first exposure time may be calculated based on the number of saturated pixels in an image having the first spectral characteristic and the second exposure time may be calculated based on the number of saturated pixels in an image having the second spectral characteristics.

Alternatively, the contrast of the image signal at each of wavelength imaged may be compared to a predetermined threshold, and the exposure time for each wavelength may be determined so that a predetermined contrast or more is obtained. That is, the first exposure time may be respectively calculated based on the contrast of an image having the first spectral characteristic and the second exposure time may calculated based on the contrast of an image having the second spectral characteristic.

Second Embodiment

Hereinafter, the second embodiment of the present invention will be described with reference to the drawings. In the second embodiment, a plurality of images acquired by a high-speed shutter is combined for each wavelength, a unit that determines whether or not the combined image is appropriate is configured, and an image with the light amount for each of the visible light and invisible light according to intended use is thereby obtained.

Figure 6:
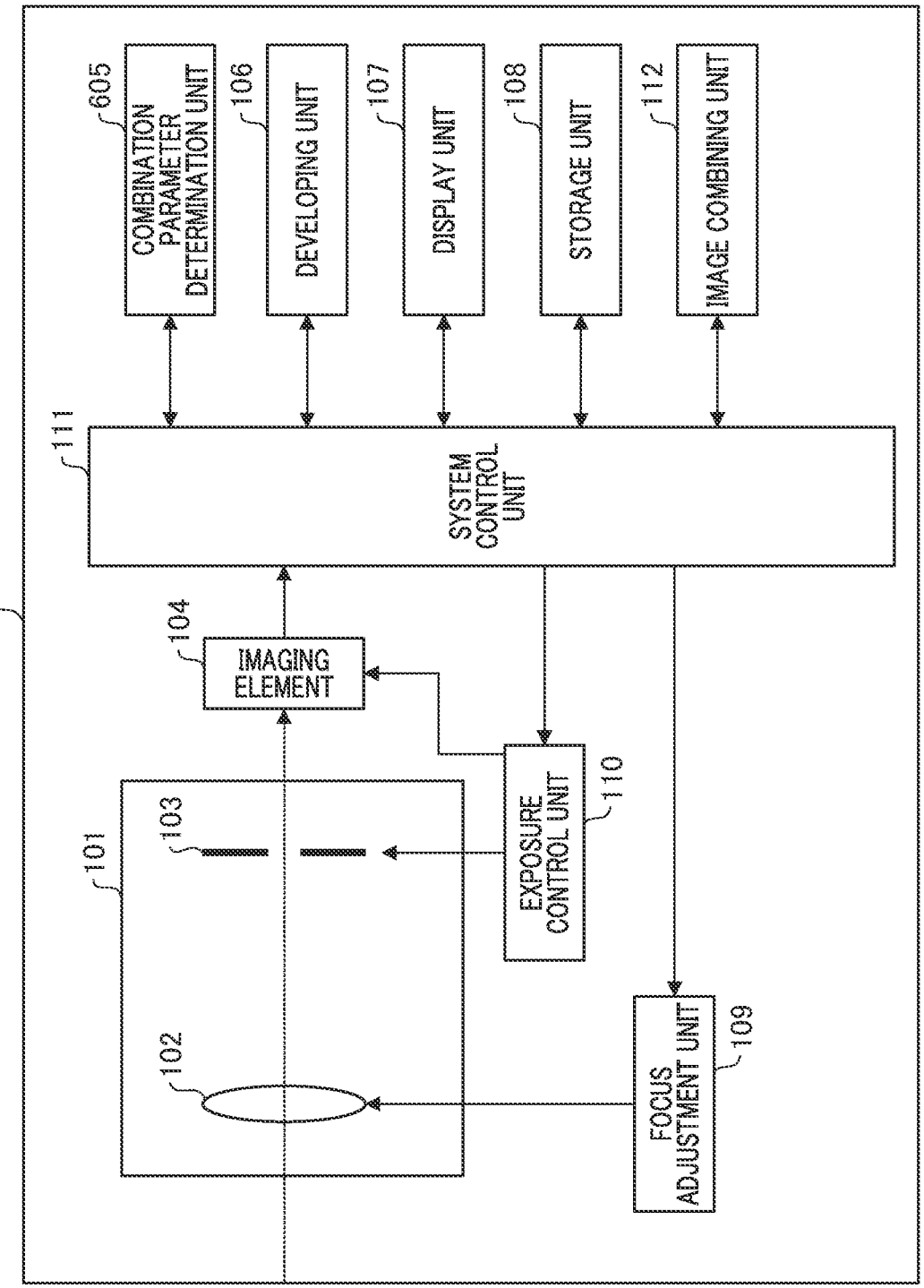
FIG. 6 is a functional block diagram of the imaging apparatus according to the second embodiment.

FIG. 6 is a functional block diagram of the imaging apparatus according to the second embodiment. Note that functional blocks with the same numbers as in FIG. 1 have the same functions and are therefore the explanation will be omitted. Reference numeral 605 denotes a combination parameter determination unit in which images at each wavelength combined by the image combining unit 112 are input, and whether or not each combined image meets a predetermined condition is determined, and thereby a combination parameter (for example, the number of images to be combined) is determined.

Figure 7:
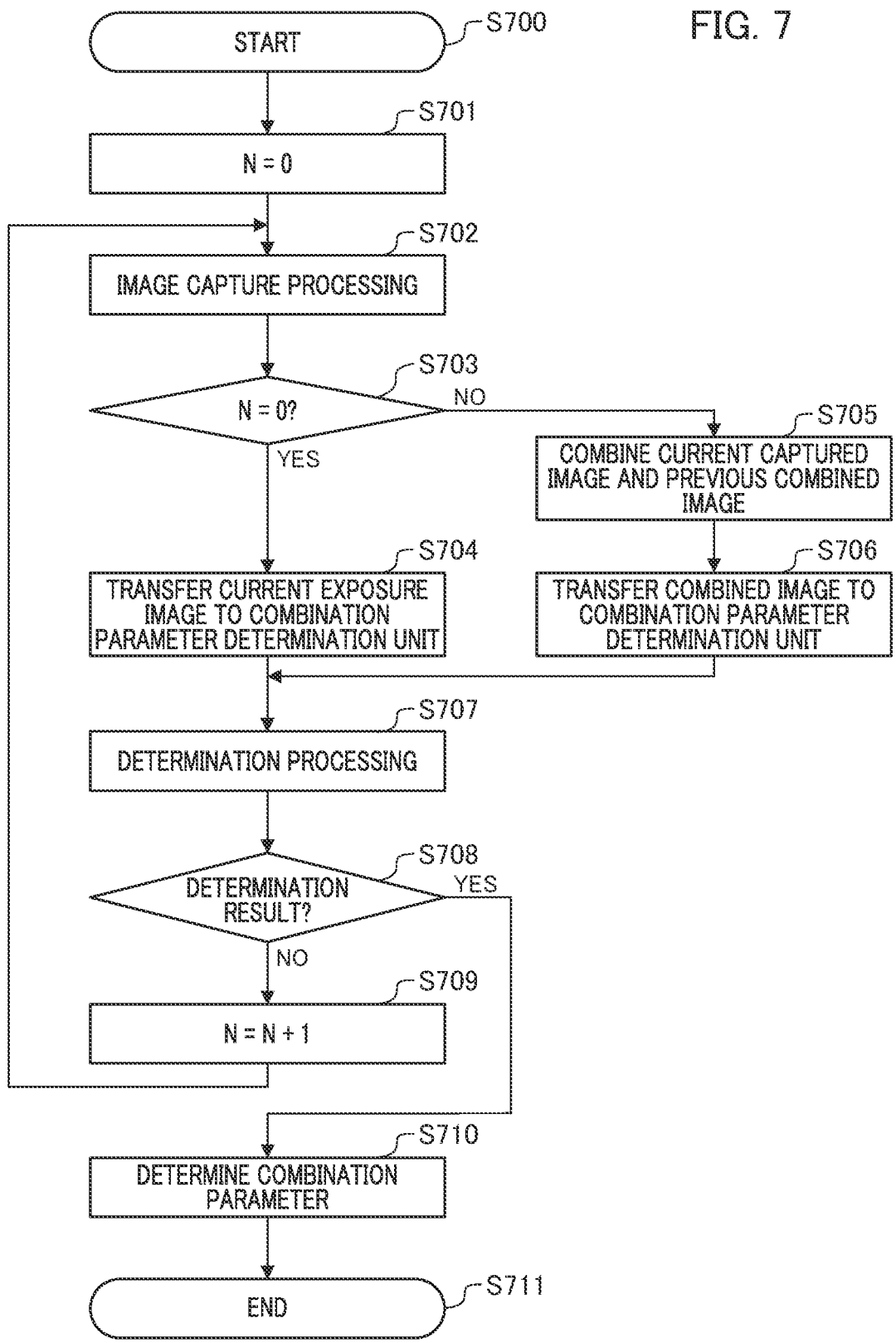
FIG. 7 is a flowchart showing the imaging processing flow according to the second embodiment.

Next, FIG. 7 is a flowchart showing the imaging processing flow according to the second embodiment, and details of the image capture processing flow will be explained with reference to FIG. 7. Note that the CPU serving as a computer in the system control unit 111 executes a computer program stored in the memory to perform the operation of each step in the flowchart in FIG. 4.

In step S700, the CPU starts the image capture processing flow in FIG. 7 by, for example, turning on the power of the imaging apparatus. Note that, although the flow in FIG. 7 is a flow that explains the processes from image capture to the determination of combination parameters corresponding to visible light, it is assumed that the similar processes are also performed for infrared light.

In step S701, the CPU initializes the value of counter N in the combination parameter determination unit 605 to 0. In step S702, the CPU performs the image capture processing based on predetermined image capture parameters (for example, aperture, exposure time, and sensitivity) by the system control unit 111, and outputs and stores the captured visible light images in the storage unit 108.

In step S703, the CPU determines whether or not the counter N in the combination parameter determination unit 605 is 0. If N is 0, the process proceeds to step S704, and if N is other than 0, the process proceeds to step S705.

In step S704, the CPU transfers the captured visible light image to the combination parameter determination unit 605. In step S705, the CPU further combines the captured visible light image and previously combined visible light image(s) by the image combining unit 112 and outputs the combined image to the storage unit 108. Note that, in the case of an image captured at the second time, the visible light image obtained in the image capture processing the first time and the visible light image obtained in the current (second) image capture processing are combined.

Here, step S705 functions as a first image combining step for generating a first combined image by combining a plurality of images having the first spectral characteristic by using the first combination parameter. Additionally, as explained above, although the flow in FIG. 7 is a flow that explains the processes from image capture to the determination of a combination parameter corresponding to visible light, it is assumed that the similar processes corresponding to infrared light are also performed.

Therefore, step S705 also functions as a second image combining step for generating a second combined image by combining a plurality of the images having the second spectral characteristic by using the second combination parameter. Additionally, at this time, the image combining unit 112 functions as the first image combining unit and the second image combining unit.

In step S706, the CPU transfers the image combined in step S705, that is, the combined image of visible light, to the combination parameter determination unit 605. Then, in step S707, the CPU causes the combination parameter determination unit 605 to determine whether or not the combined image satisfies a predetermined condition, that is, whether or not the combined image is appropriate.

The predetermined condition (condition in which the combined image is appropriate) may be set arbitrarily, and, for example, whether or not the contrast of the image is a predetermined threshold or more may be used as a condition for determination. That is, each of the first combined image and the second combined image may be evaluated based on the contrast of each combined image.

Alternatively, whether or not the number of saturated pixels whose pixel value in the image is a predetermined value or more reaches a predetermined number may be used as a condition for determination. That is, each of the first combined image and the second combined image may be evaluated based on the number of saturated pixels in each combined image.

Additionally, the exposure condition determination unit 105 explained in the first embodiment may be provided to enable calculating the exposure time for which an exposure image in which, for example, the average value of the luminance of the image at each wavelength is appropriate can be obtained. Then, whether or not the exposure time for which an exposure image in which the average value of luminance of the combined image obtained by the current combined processing is appropriate may be set as the condition for determination. Alternatively, each of the first combined image and the second combined image may be evaluated based on the average value of the luminance in each of the combined images.

In step S708, in the CPU, if the determination result is appropriate, the process proceeds to step S710, and if the result of the determination processing is not appropriate, the process proceeds to step S709. In step S709, the CPU adds 1 to the value of the counter in the combination parameter determination unit 605.

In step S710, the CPU determines the combination parameter for visible light based on the counter N in the combination parameter determination unit 605. Then, in step S711, the CPU ends the flow of image capture processing.

As described above, the flow in FIG. 7 shows the processing not only for visible light but for infrared light. Therefore, steps S707 to S710 function as determination steps for determining the first combination parameter and the second combination parameter by evaluating each of the first combined image and second combined image based on predetermined conditions. Note that the first combination parameter and the second combination parameter include, for example, the number of images to be used for combination.

Note that, here, attention is paid on only the image in visible light, and the processes from image capture to determination of the combination parameter have been explained. However, because in the image capture processing, an infrared light image is also acquired at the same time, the combination parameter for infrared light can be calculated by applying a similar processing flow. Note that the conditions for the determination processing in step S707 may be different for visible light and infrared light.

According to the flow as described above, the image capture processing for one time is performed. Note that, in the continuous image capture in the same scene, an assumption is established that there is little significant change in the image signals between image capture. Accordingly, in the second and following imaging processing, the determination processing in step S707 may be performed with the condition that the number of combined images at each wavelength reaches a predetermined value. Therefore, it is possible to stably acquire a captured image with an appropriate amount of light.

As explained above, in the imaging apparatus 600 in the second embodiment, it is determined whether or not a combined image with a suitable amount of light is obtained for each wavelength while image capture and combination are repeated with a predetermined exposure time. As a result, it is possible to obtain only the number of exposure images corresponding to the combination parameters, with a suitable amount of light in both visible and infrared light.

Note that, as explained in the first embodiment, each of the first image signal and the second image signal may be read out without being added, then added by the developing unit, and combining processing that is similar to that in the second embodiment may be performed on the image to which addition has been performed.

Additionally, in the first and second embodiments, an example of what is referred to as a "DAF (Dual Pixel Auto Focus) sensor" having a pair of photoelectric conversion elements in each pixel of the imaging element has been explained. However, the present invention can also be applied, for example, to a configuration in which light passing through a shared optical system is divided into visible light and infrared light, and each of light is imaged by separate image sensors.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the imaging apparatus through a network or various storage media. Then, a computer (or a CPU, an MPU, or the like) of the imaging apparatus may be configured to read and execute the program. In such a case, the program and the storage medium storing the program configure the present invention.

This application claims the benefit of Japanese Patent Application No. 2022-109350, filed on Jul. 6, 2022, which is hereby incorporated by reference herein in its entirety.

What is claimed is:

1. An imaging apparatus comprising:
an imaging device having a first imaging unit configured to generate an image having a first spectral characteristic and a second imaging unit configured to generate an image having a second spectral characteristic;
at least one processor or circuit configured to function as:
a calculation unit configured to calculate a first exposure time appropriate for an image having the first spectral characteristic and a second exposure time appropriate for an image having the second spectral characteristic;
a control unit configured to, in a case where the first exposure time is longer than the second exposure time, perform first image capture with the second exposure time to generate a first image having the first spectral characteristic and a second image having the second spectral characteristic, and perform second image capture with an exposure time corresponding to a difference between the first exposure time and the second exposure time to generate a third image having the first spectral characteristic; and
a combining unit configured to combine the first image and the third image to generate a combined image.

2. The imaging apparatus according to claim 1, wherein one of the first spectral characteristic and the second spectral characteristic is visible light, and the other one is invisible light.

3. The imaging apparatus according to claim 2, wherein the invisible light includes infrared light.

4. The imaging apparatus according to claim 1, wherein the first imaging unit and the second imaging unit are disposed in the same imaging element.

5. The imaging apparatus according to claim 1, wherein the first exposure time and the second exposure time are respectively calculated based on an average level of luminance of an image having the first spectral characteristic and an average level of luminance of an image having the second spectral characteristic.

6. The imaging apparatus according to claim 1, wherein the first exposure time and the second exposure time are respectively calculated based on the number of saturated pixels in an image having the first spectral characteristic and the number of saturated pixels in an image having the second spectral characteristic.

7. The imaging apparatus according to claim 1, wherein the first exposure time and the second exposure time are respectively calculated based on contrast of an image having the first spectral characteristic and contrast of an image having the second spectral characteristic.

8. An imaging method comprising:
generating an image having a first spectral characteristic by using a first imaging unit and an image having a second spectral characteristic by using a second imaging unit;
calculating a first exposure time appropriate for an image having the first spectral characteristic and a second exposure time appropriate for an image having the second spectral characteristic are calculated;
performing, in a case where the first exposure time is longer than the second exposure time, first image capture with the second exposure time to generate a first image having the first spectral characteristic and a second image having the second spectral characteristic, and performing second image capture with an exposure time corresponding to a difference between the first exposure time and the second exposure time to generate a third image having the first spectral characteristic is acquired; and
combining the first image and the third image to generate a combined image.

9. A non-transitory computer-readable storage medium storing a computer program including instructions for executing following processes:

generating an image having a first spectral characteristic by using a first imaging unit and an image having a second spectral characteristic by using a second imaging unit;

calculating a first exposure time appropriate for an image having the first spectral characteristic and a second exposure time appropriate for an image having the second spectral characteristic are calculated;

performing, in a case where the first exposure time is longer than the second exposure time, first image capture with the second exposure time to generate a first image having the first spectral characteristic and a second image having the second spectral characteristic, and performing second image capture with an exposure time corresponding to a difference between the first exposure time and the second exposure time to generate a third image having the first spectral characteristic is acquired; and combining the first image and the third image to generate a combined image.

* * * * *